United States Patent [19]
Garg et al.

[11] Patent Number: 5,417,774
[45] Date of Patent: May 23, 1995

[54] HEAT TREATING ATMOSPHERES

[75] Inventors: Diwakar Garg, Macungie; Brian B. Bonner, Nesquehoning; Donald P. Eichelberger, Macungie; Kerry R. Berger, Lehighton, all of Pa.

[73] Assignee: Air Products and Chemicals, Inc., Allentown, Pa.

[21] Appl. No.: 995,624

[22] Filed: Dec. 22, 1992

[51] Int. Cl.[6] .................... C21D 1/00; C21D 9/00
[52] U.S. Cl. .................... 148/208; 148/216; 148/218
[58] Field of Search .................... 148/208, 216, 218

[56] References Cited

U.S. PATENT DOCUMENTS

| | | | |
|---|---|---|---|
| 3,535,074 | 10/1970 | Nakashima | 23/2 |
| 4,859,434 | 8/1989 | Roberts et al. | 423/219 |
| 4,931,070 | 6/1990 | Prasad | 55/16 |
| 5,057,164 | 10/1991 | Nelsson et al. | 148/16 |
| 5,069,728 | 12/1991 | Rancon et al. | 148/16 |
| 5,160,380 | 11/1992 | Vocke et al. | 148/206 |

FOREIGN PATENT DOCUMENTS

| | | |
|---|---|---|
| 4556189 | 11/1989 | Australia . |
| 4556289 | 11/1989 | Australia . |
| 0404496 | 6/1990 | European Pat. Off. . |
| 2639249 | 5/1990 | France . |
| 2639251 | 5/1990 | France . |

OTHER PUBLICATIONS

P. Murzyn & L. Flores, Jr., Carburizing with Membrane $N_2$, Process and Quality Issues, Mar. 1988, pp. 28–32.

H. Walton, New Method of Generating Nitrogen for Controlled Atmosphere Heat Treatment at Torrington Shiloh Plant, Mar. 1986 pp. 40–46.

P. F. Stratton, The Use of Non–Cryogenically Produced Nitrogen in Furnace Atmospheres, 1989, pp. 63–67.

D. J. Bowe & D. L. Fung, How PSA Nitrogen Works in a Heat Treating Shop, pp. 30–33.

Primary Examiner—Upendra Roy
Attorney, Agent, or Firm—James C. Simmons

[57] ABSTRACT

A process for producing low-cost atmospheres suitable for annealing, brazing, and sintering ferrous and non-ferrous metals and alloys, neutral hardening low, medium, and high carbon steels, sintering ceramic powders, and sealing glass to metal from non-cryogenically produced nitrogen containing up to 5% residual oxygen is disclosed. According to the process, suitable atmospheres are produced by 1) pre-heating the non-cryogenically produced nitrogen stream containing residual oxygen to a desired temperature, 2) mixing it with more than a stoichiometric amount a hydrocarbon gas, 3) passing it through a reactor packed with a platinum group of metal catalyst to reduce the residual oxygen to very low levels and convert it to a mixture of moisture and carbon dioxide, and 4) introducing the reactor effluent stream into the heating zone of a furnace and converting in-situ a portion of both moisture and carbon dioxide with a hydrocarbon gas to a mixture of carbon monoxide and hydrogen. The key features of the disclosed process include 1) pre-heating the non-cryogenically produced nitrogen containing residual oxygen to a certain minimum temperature, 2) adding more than a stoichiometric amount of a hydrocarbon gas to the pre-heated nitrogen stream, 3) using a platinum group of metal catalyst to initiate and sustain the reaction between oxygen and the hydrocarbon gas, and 4) converting in-situ a portion of both moisture and carbon dioxide with a hydrocarbon gas to a mixture of carbon monoxide and hydrogen in the heating zone of a furnace.

10 Claims, 4 Drawing Sheets

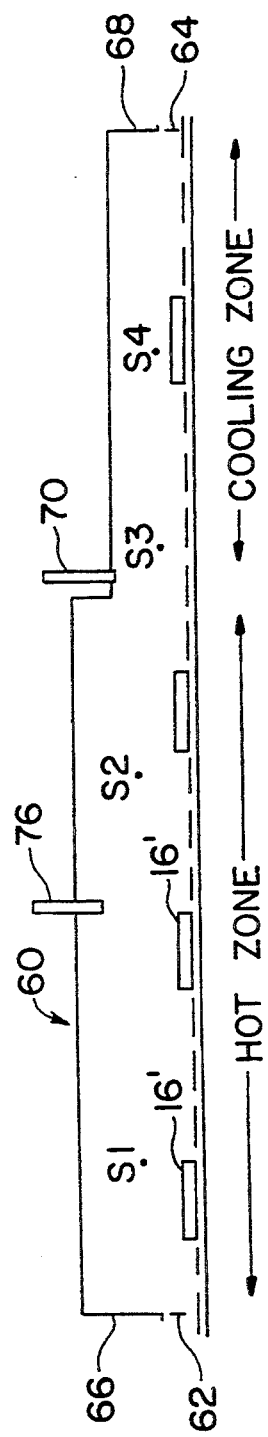

HEAT TREATING ATMOSPHERES

FIELD OF THE INVENTION

The present invention pertains to conversion of residual oxygen in a non-cryogenically produced nitrogen stream followed by further reaction of components of the steam in-situ in a heat treating furnace.

BACKGROUND OF THE INVENTION

Nitrogen-based atmospheres have been routinely used by the heat treating industry both in batch and continuous furnaces since mid seventies. Because of low dew point and virtually absence of carbon dioxide, nitrogen-based atmospheres do not exhibit oxidizing and decarburizing properties and are therefore suitable for a variety of heat treating operations. More specifically, a mixture of nitrogen and hydrogen has been extensively used for bright annealing low to high carbon steels and non-ferrous metals and alloys such as copper and gold. A mixture of nitrogen and a hydrocarbon such as methane or propane has gained wide acceptance for neutral hardening and decarburization-free annealing of medium to high carbon steels. A mixture of nitrogen and methanol has been developed and used for carburizing low to medium carbon steels. Finally, a mixture of nitrogen, hydrogen, and moisture has been used for brazing metals and sealing glass to metals.

A major portion of nitrogen used by the heat treating industry has been produced by distillation of air in large cryogenic plants. The cryogenically produced nitrogen is generally pure and expensive. To reduce the cost of nitrogen, several non-cryogenic air separation techniques such as adsorption and permeation have been recently developed and introduced in the market. The non-cryogenically produced nitrogen is much less expensive to produce, but it contains 0.1 to 5% residual oxygen, making a direct substitution of cryogenically produced nitrogen with non-cryogenically produced nitrogen in continuous heat treating furnaces very difficult if not impossible. Non-cryogenically produced nitrogen has, however, been successfully used to replace cryogenically produced nitrogen in applications where surface oxidation can be tolerated. For example, non-cryogenically produced nitrogen has been successfully used in oxide annealing of carbon steel parts which are generally machined after heat treatment.

Non-cryogenically produced nitrogen has also been successfully used to replace cryogenically produced nitrogen in applications where surface finish or appearance is not important. For example, a mixture of non-cryogenically produced nitrogen and methanol is being used commercially for carburizing steels in batch furnaces as well as continuous furnaces equipped with integrated quench cooling zones. Carburizing processes based on non-cryogenically produced nitrogen/methanol mixture have been described in detail in papers titled, "Carburizing with Membrane $N_2$: Process and Quality Issues", published in Heat Treating, pages 28–32, March 1988, "New Method of Generating Nitrogen for Controlled Atmosphere Heat Treatment at Torrington Shiloh Plant", published in Industrial Heating, pages 40–46, March 1986, and "The Use of Non-Cryogenically Produced Nitrogen in Furnace Atmospheres", published in Heat Treatment of Metals, pages 63–67, March 1989. The use of non-cryogenically produced nitrogen/methanol mixture has, however, not been successful for bright annealing or heat treating parts without surface oxidation in continuous furnaces or for heat treating parts in continuous furnaces operated at temperatures below about 900° C. These systems are not cost-effective because they require expensive methanol delivery system.

Attempts, with limited success, have been made to use other reducing gases such as a hydrocarbon and hydrogen along with non-cryogenically produced nitrogen to produce atmospheres suitable for heat treating or bright annealing parts in continuous furnaces. The problem has generally been related to surface oxidation of the heat treated or annealed parts in the cooling and/or heating zones of the furnace. For example, methane has been added into the heating zone of continuous furnaces with non-cryogenically produced nitrogen in an attempt to generate atmospheres suitable for oxidation- and decarburization-free annealing or hardening of carbon steels. This method was not successful due to excessive oxidation and decarburization of the parts, as described in a paper titled, "The Use of Non-Cryogenically Produced Nitrogen in Furnace Atmospheres", published in Heat Treatment of Metals, pages 63–67, March 1989. The oxidation and decarburization problems were related to the slow rate of reaction between oxygen and methane at low temperatures and/or short residence times in continuous furnaces used for oxide- and decarburize-free annealing. The above paper concluded that non-cryogenically produced nitrogen would be cost competitive to cryogenically produced nitrogen only at residual oxygen levels below about 0.2%, if at all possible. Attempts have also been made to use hydrogen gas as a reducing agent with non-cryogenically produced nitrogen for oxide-free and bright annealing of carbon steels in continuous furnaces. Unfortunately, the process required excessive amounts of hydrogen, making the use of non-cryogenically produced nitrogen economically unattractive.

A mixture of non-cryogenically produced nitrogen and hydrogen has been used for annealing copper and described in papers titled, "The Use of Non-Cryogenically Produced Nitrogen in Furnace Atmospheres", published in Heat Treatment of Metals, pages 63–67, March 1989 and "A Cost Effective Nitrogen-Based Atmosphere for Copper Annealing", published in Heat Treatment of Metals, pages 93–97, April 1990. These papers describe that heat treated copper product was slightly discolored when all the gaseous feed containing a mixture of hydrogen and non-cryogenically produced nitrogen with residual oxygen was introduced into the hot zone of a continuous furnace. It is, therefore, clearly evident that according to the prior art, copper cannot be bright annealed with a mixture of non-cryogenically produced nitrogen and hydrogen in continuous furnaces.

U.S. Pat. No. 5,057,164 discloses and claims a process producing atmospheres suitable for heat treating metals from non-cryogenically produced nitrogen in continuous furnaces by reacting residual oxygen with hydrogen or carbon monoxide in the heating zone followed by removing a part of the atmosphere from the heating zone and introducing it into the cooling zone of the furnace. Unfortunately, this process requires large amounts of hydrogen or carbon monoxide to provide high $pH_2/pH_2O$ or $pCO/pCO_2$ ratio (or reducing environment) in the furnace, making it uneconomical for bright annealing steels, brazing steels, and sintering steel powders in continuous furnaces.

Researchers have explored numerous alternative ways of using non-cryogenically produced nitrogen for heat treating metals in continuous furnaces. For example, furnace atmospheres suitable for bright annealing copper, brazing copper, decarburized annealing steel, and sintering copper and copper alloys have been claimed to be generated from non-cryogenically produced nitrogen by converting residual oxygen to moisture with hydrogen gas in external units prior to feeding atmospheres into the furnaces. Such atmosphere generation methods have been disclosed in detail in U.S. Pat. No. 3,535,074, Australian Patent Applications AU45561/89 and AU45562/89 dated 24 Nov. 1988, and European Patent Application 90306645.4 dated 19 Jun. 1990. Unfortunately, these processes are not cost-effective for bright annealing steels, brazing steels, and sintering steel powders because they require large amounts of hydrogen to maintain high $pH_2/pH_2O$ ratio (or reducing environment) in the furnace. Additionally, these processes are limited in scope because they result in excessive decarburization of steel parts.

U.S. Pat. No. 4,931,070 and French patent publications 2,639,249 and 2,639,251 dated 24 Nov. 1988 claim producing atmospheres suitable for heat treating metals from non-cryogenically produced nitrogen by converting residual oxygen to moisture with hydrogen in external catalytic units followed by extraction of moisture prior to introducing atmospheres into furnaces. These methods are not cost effective because of the substantial costs involved in removing moisture from atmospheres.

U.S. Pat. No. 5,069,728 discloses and claims a method of producing atmospheres suitable for heat treating from non-cryogenically produced nitrogen by simultaneously introducing non-cryogenically produced nitrogen along with hydrogen and carbon monoxide into the heating zone and non-cryogenically produced nitrogen pre-treated to convert the residual oxygen to moisture with hydrogen in an external catalytic reactor or nitrogen gas free of oxygen into the cooling zone of a continuous furnace. Unfortunately, this method requires large amounts of hydrogen or carbon monoxide to maintain high $pH_2/pH_2O$ or $pCO/pCO_2$ ratio (or reducing environment) in the furnace, making it uneconomical for bright annealing steels, brazing steels, and sintering steel powders in continuous furnaces.

U.S. Pat. No. 4,859,434 claims producing atmospheres suitable for heat treating from non-cryogenically produced nitrogen by reacting residual oxygen with vaporized methanol in an external catalytic reactor. This method has not been used in many parts of the world because of the costs involved in installing a methanol delivery system.

Based upon the above discussion, it is clear that there is a need to develop a process for generating low-cost atmospheres for bright annealing ferrous and non-ferrous metals and alloys, brazing steels, sealing glass to metals, neutral hardening low, medium, and high carbon steels, and sintering metal and ceramic powders in continuous furnaces from non-cryogenically produced nitrogen. Additionally, there is a need to develop a process which 1) is cost effective, 2) eliminates need of both expensive hydrogen and delivery system for the reducing agent, and 3) minimizes or prevents decarburization of steels during heat treatment.

SUMMARY OF THE INVENTION

This invention discloses a processes for producing low-cost atmospheres suitable for bright annealing or heat treating ferrous and non-ferrous metals and alloys, brazing metals, sintering metal and ceramic powders, sealing glass to metals in continuous furnaces with separate heating and cooling zones and for neutral hardening low, medium, or high carbon containing steels in continuous furnaces with an integrated quench cooling zone, from non-cryogenically produced nitrogen. According to the process, suitable atmospheres are produced by 1) pre-heating the non-cryogenically produced nitrogen stream containing residual oxygen to a desired temperature, 2) mixing the pre-heated stream with more than a stoichiometric amount of a hydrocarbon gas, 3) passing the mixture through a reactor packed with a platinum group of metal catalyst to reduce the residual oxygen to very low levels by conversion to a mixture of moisture and carbon dioxide, and 4) converting in-situ in the furnace a portion of both moisture and carbon dioxide with a hydrocarbon gas to a mixture of carbon monoxide and hydrogen.

According to the invention, low and high carbon steels can be oxide annealed in a continuous furnace operated at or below 700° C. using an atmosphere produced by 1) pre-heating the non-cryogenically produced nitrogen stream containing residual oxygen to a desired temperature, 2) mixing the pre-heated stream with more than a stoichiometric amount of a hydrocarbon gas, 3) passing the mixture through a reactor packed with a platinum group metal catalyst to reduce the residual oxygen to very low levels by conversion to an effluent mixture of moisture and carbon dioxide, and 4) introducing the effluent mixture into the heating or cooling zone of a furnace.

According to an embodiment of the invention, low and high carbon steels are oxide annealed in a continuous furnace operated at or below 1,100° C. using an atmosphere produced by 1) pre-heating the non-cryogenically produced nitrogen stream containing residual oxygen to a desired temperature, 2) mixing pre-heated stream with more than a stoichiometric amount of a hydrocarbon gas, 3) passing the mixture through a reactor packed with a platinum group metal catalyst to reduce the residual oxygen to very low levels by conversion to an effluent mixture of moisture and carbon dioxide, and 4) introducing the mixture into the cooling zone of a furnace.

According to another embodiment of the invention, low and high carbon steels are bright annealed in a continuous furnace operated above about 700° C. using an atmosphere produced by 1) pre-heating the non-cryogenically produced nitrogen stream containing residual oxygen to a desired temperature, 2) mixing the pre-heated stream with more than four times the stoichiometric amount of a hydrocarbon gas, 3) passing the mixture platinum group of metal catalyst to reduce the residual oxygen to very low levels by conversion to an effluent mixture of moisture and carbon dioxide, and 4) introducing the effluent mixture into the cooling zone of a furnace.

According to another embodiment of the invention, low and high carbon steels are bright annealed in a continuous furnace operated above about 700° C. using an atmosphere produced by 1) pre-heating the non-cryogenically produced nitrogen stream containing residual oxygen to a desired temperature, 2) mixing the pre-heated stream with more than a stoichiometric amount of a hydrocarbon gas, 3) passing the mixture through a reactor packed with a platinum group metal catalyst to reduce the residual oxygen to very low levels by conversion to an effluent mixture of moisture and carbon dioxide, and 4) introducing the effluent mixture into the heating zone of a furnace.

The atmospheres suitable for brazing steels, sintering metal and ceramic powders, sealing glass to metals, and annealing non-ferrous metals and alloys are produced in a continuous furnace operated at above about 700° C. by 1) pre-heating the non-cryogenically produced nitrogen stream containing residual oxygen to a desired temperature, 2) mixing the preheated stream with more than a stoichiometric amount of a hydrocarbon gas, 3) passing the mixture through a reactor packed with a platinum group metal catalyst to reduce the residual oxygen to very low levels by conversion to an effluent mixture of moisture and carbon dioxide, and 4) introducing the effluent mixture into the heating zone of the furnace.

Finally, atmospheres suitable for neutral hardening low, medium, or high carbon containing steels are produced in a continuous furnace with integrated quench cooling zone and operated at above about 800° C. by 1) preheating the non-cryogenically produced nitrogen stream containing residual oxygen to a desired temperature, 2) mixing the pre-heated stream with more than a stoichiometric amount of a hydrocarbon gas, 3) passing it through a reactor packed with a platinum group of metal catalyst to reduce the residual oxygen to very low levels by conversion to an effluent mixture of moisture and carbon dioxide, and 4) introducing the effluent mixture into the heating zone of the furnace.

BRIEF DESCRIPTION OF THE DRAWINGS

FIG. 1 is a schematic representation of a continuous heat treating furnace for used to test the heat treating process according to the present invention.

DETAILED DESCRIPTION OF THE INVENTION

Figure 2A:
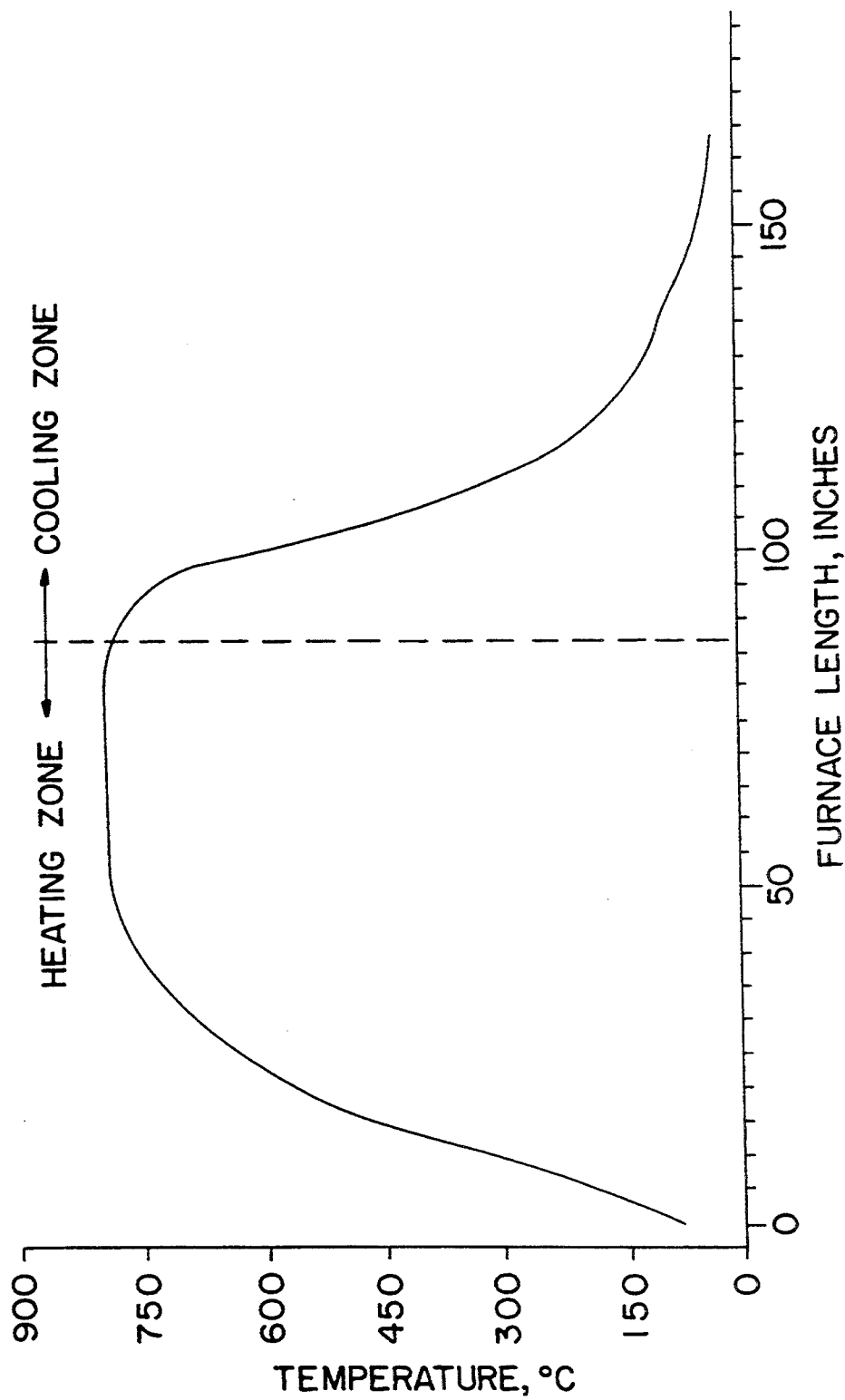
FIG. 2A is a plot of temperature against length of the furnace illustrating the experimental furnace profile for a heat treating temperature of 750° C.

Processes according to the present invention are used for producing low-cost atmospheres suitable for heat treating ferrous and non-ferrous metals and alloys, neutral hardening low, medium and high carbon steels, sintering metal and ceramic powders, and sealing glass to metal in continuous furnaces using non-cryogenically produced nitrogen are based on the surprising discovery that such atmospheres can be produced by 1) pre-heating a non-cryogenically produced nitrogen stream containing residual oxygen to a desired temperature, 2) mixing the pre-heated nitrogen stream with a hydrocarbon gas such as natural gas or propane, 3) flowing the pre-heated mixture through a catalytic reactor to produce an effluent mixture where residual oxygen has been converted to a mixture of moisture and carbon dioxide, and 4) introducing the effluent mixture into the heating zone of a heat treating furnace where a portion of both moisture and carbon dioxide are converted in-situ by reaction with unreacted hydrocarbon gas in the effluent mixture to a mixture of carbon monoxide and hydrogen.

Nitrogen gas produced by cryogenic distillation of air has been widely employed in many heat treating applications. Cryogenically produced nitrogen is substantially free of oxygen (oxygen content has generally been less than 10 ppm) is expensive to produce. Therefore, there has been a great demand, especially by the heat treating industry, to generate nitrogen inexpensively for heat treating applications. With the advent of non-cryogenic technologies for air separation such as adsorption and permeation, it is now possible to produce nitrogen gas inexpensively. The non-cryogenically produced nitrogen, however, is contaminated with up to 5% residual oxygen, which is generally undesirable for many heat treating applications. The presence of residual oxygen has made the direct substitution of cryogenically produced nitrogen with that produced by non-cryogenic techniques very difficult.

According to the present invention, scaling and oxidation problems are overcome by 1) converting residual oxygen present in the non-cryogenically produced nitrogen with an inexpensive hydrocarbon gas to a mixture of moisture and carbon dioxide in an external catalytic reactor and 2) using the reactor effluent stream containing a mixture of nitrogen, moisture, carbon dioxide, and unreacted hydrocarbon gas into a furnace used for annealing, brazing, neutral hardening low, medium and high carbon steels and sintering ferrous and non-ferrous metals and alloys, sintering ceramic powders, and sealing glass to metal. The function of the external reactor is to convert most of the residual oxygen present in the non-cryogenically produced nitrogen with a hydrocarbon gas to a mixture of moisture and carbon dioxide and produce an effluent stream containing nitrogen, unreacted hydrocarbon gas, moisture, carbon dioxide and less than 10 ppm oxygen. Introducing the effluent stream into the heating zone of a furnace cause a part of both the moisture and carbon dioxide to be converted by reaction with the hydrocarbon gas, via shift reaction, to a mixture of carbon monoxide and hydrogen to produce the desired furnace atmosphere.

The residual oxygen in non-cryogenically produced nitrogen for the process of the present invention can vary from 0.05% to about 5%, preferably from about 0.1% to about 3%, and ideally from about 0.1% to about 1.0%.

The non-cryogenically produced nitrogen stream is pre-heated to a temperature ranging from about 200° to 400° C., preferably, to a temperature varying from about 225° to about 350° C. The pre-heating temperature required depends on the reactivity and the nature of the hydrocarbon gas used. For example, the pre-heating temperature required with propane is considerably lower than that required with methane or natural gas. Since the reaction between residual oxygen and a hydrocarbon gas is exothermic in nature, it is advisable to limit the pre-heating temperature to below about 400° C. to avoid the thermal cracking of the hydrocarbon gas and the deposition of coke on the catalyst. Instead of pre-heating the feed gas, the catalytic reactor can be heated directly to the desired temperature.

The amount of a hydrocarbon gas required for converting residual oxygen to a mixture of moisture and carbon dioxide in the presence of a platinum group metal catalyst is more than a stoichiometric amount required for converting completely oxygen to a mixture of moisture and carbon dioxide. It is advisable not to use too much excess hydrocarbon to avoid the thermal cracking of the hydrocarbon gas and the deposition of coke on the catalyst. Preferably, the amount of a hydrocarbon gas required for converting residual oxygen to a mixture of moisture and carbon dioxide in an external catalytic reactor is 1.5 times the stoichiometric amount or more. The hydrocarbon gas can be selected from alkanes such as methane, ethane, propane, and butane and alkenes such as ethylene, propylene, and butene. Commercial feedstocks such as natural gas, petroleum gas, cooking gas, coke oven gas, and town gas can also be used as a hydrocarbon.

The catalytic reactor is packed with a precious metal catalyst supported on a high surface area support material made of alumina, magnesia, zirconia, silica, titania, or mixtures thereof. The precious metal catalyst can be selected from platinum group metals such as platinum, palladium, rhodium, ruthenium, iridium, osmium, or mixtures thereof. The metal concentration in the catalyst can vary from about 0.05 to about 1.0% by weight, preferably, between 0.2 to 0.5% by weight a metal catalyst shaped in the form of pellets or balls of palladium, platinum, or mixtures thereof supported on a high surface area alumina is preferable. Commercially available palladium and platinum metal based catalysts such as Type 30196-29 supplied by GPT, Inc., Manalapan, N.J., R0-20, R0-21, and R0-22 supplied by BASF Corporation, Parsippany, N.J., and Type 48, 50, 50A, 50B, 54, and 73 supplied by Johnson Matthey, Wayne, Pa. can also be used for deoxygenating nitrogen stream.

The precious metal catalysts identified above can optionally be supported on a metallic or a ceramic honeycomb structure to avoid problems related to pressure drop through the reactor. The cell density in the honeycomb structure can vary from about 100 to 400 cells per square inch. A cell density above about 200 cells per square inch is especially preferable. The metal concentration in the catalyst can vary from about 0.05 to about 1.0% by weight (or from about 10 to 30 mg precious metal per cubic foot of catalyst volume), preferably, from about 0.2 to 0.5 wt % palladium or a mixture of platinum and palladium in the metal form supported on honeycomb structure. The honeycomb structure can be similar to the one described in a technical brochure "VOC destruction through catalytic incineration" published by Johnson Matthey, Wayne Pa. It can also be similar to the ones described in technical brochures "High Performance Catalytic Converters With Metal Cores" published by Camet Co., Hiram, Ohio and "Celcor (registered trade mark of Corning) Honeycomb Catalysts Support" published by Corning, N.Y.

The hourly flow rate of gaseous mixture flowing through the catalytic reactor can vary from about 100 to 50,000 times the volume of the reactor. It can preferably vary from about 1,000 to 20,000 times the volume of the reactor. More preferably, it can vary from about 2,000 to 10,000 times the volume of the reactor.

The effluent stream from the catalytic reactor containing a mixture of nitrogen, moisture, carbon dioxide, unreacted hydrocarbon gas, and less than 10 ppm residual oxygen is introduced into the cooling or the transition zone of a continuous furnace through an open tube for heat treating ferrous and non-ferrous metals and alloys, sintering metal and ceramic powders, and sealing glass to metal. Optionally, the reactor effluent stream containing a mixture of nitrogen, unreacted hydrocarbon gas, moisture and carbon dioxide is introduced into the heating zone of a continuous furnace through an open tube to convert a part of both the moisture and carbon dioxide in-situ to a mixture of carbon monoxide and hydrogen via shift reaction with a hydrocarbon gas to produce suitable atmospheres. The internal diameter of the open tube can vary from 0.25 in. to 5 in. The open tube can be inserted in the heating or the cooling zone of the furnace through the top, sides, or the bottom of the furnace depending upon the size and the design of the furnace.

Figure 3:
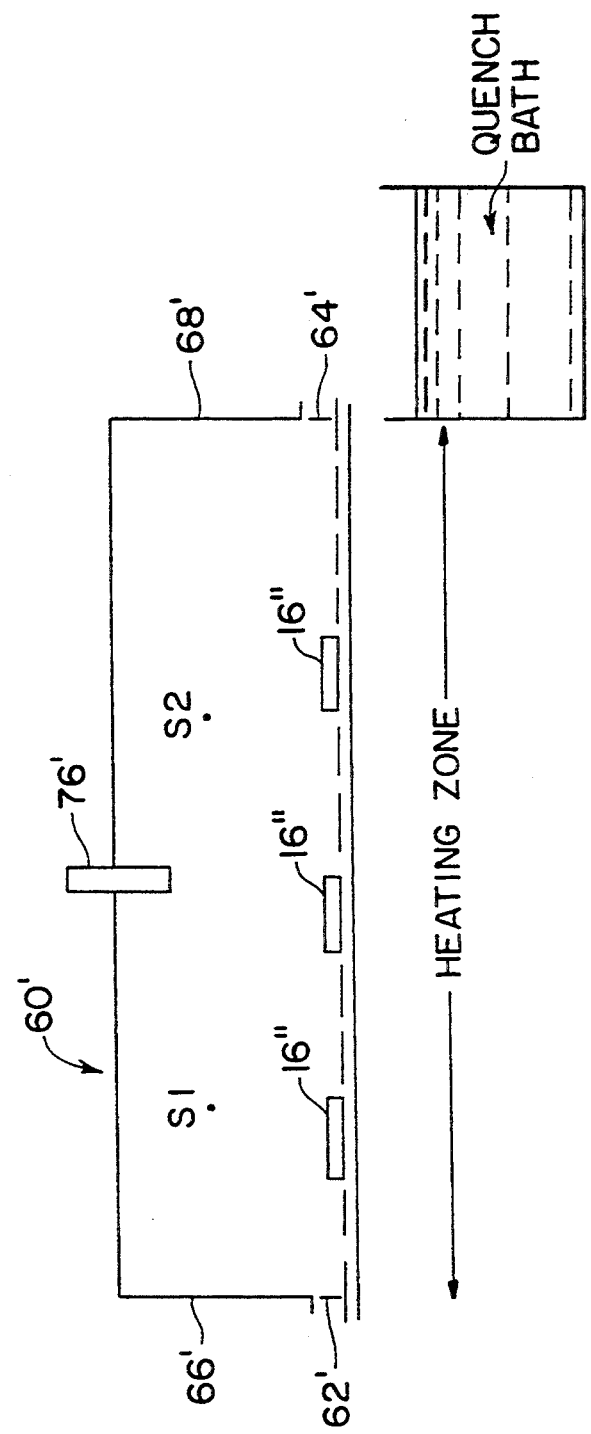
FIG. 3 is a schematic representation of a continuous furnace with an integrated quench cooling zone used to neutral harden steels.

In order to enhance the conversion of both moisture and carbon dioxide with a hydrocarbon gas via shift reaction and to minimize or prevent the decarburization of steels, the effluent gas stream from the catalytic reactor is preferably introduced into the heating zone of a furnace through a device shown as FIG. 3 in U.S. patent application Ser. No. 07/727,806 filed Jul. 8, 1991 the specification of which is incorporated herein by reference, that prevents the direct impingement of feed gas on the parts. A particularly effective device is shown in FIG. 3C of the application.

In addition to using devices according to the application referral to above, a flow directing plate or a device facilitating mixing of hot gases present in the furnace with the feed gas can also be used.

A continuous furnace with separate heating and cooling zones is most suitable for the process of the invention. It can be operated at atmospheric or above atmospheric pressure for the process of the invention. The continuous furnace can be of the mesh belt, a roller hearth, a pusher tray, a walking beam, or a rotary hearth type. The continuous furnace can optionally be equipped with a pure nitrogen gas (containing less than 10 ppm oxygen) curtain at the end of the cooling zone (discharge end) to avoid infiltration of air from the outside through the discharge vestibule. Furthermore, a pure oxygen-free nitrogen stream such as the one produced by vaporizing liquid nitrogen can optionally be used in the cooling zone of the furnace.

A continuous furnace with a heating zone and an integrated quench cooling zone is also ideal for the present invention. It can be operated at atmospheric or above atmospheric pressure. The continuous furnace can be of the mesh belt, shaker, a roller hearth, a pusher tray, a shaker hearth, a rotary retort, or a rotary hearth type. A pure oxygen-free nitrogen stream such as the one produced by vaporizing liquid nitrogen can optionally be used in the quench cooling zone of the furnace to prevent infiltration of air from the outside.

Normal operating temperature of the heat treating furnaces used with the present invention are above about 600° C.

The catalytic reactor effluent gas can be fed directly into the heating zone of a continuous furnace equipped with a separate cooling zone or an integrated quench cooling zone, saving heating requirements for the furnace. The reactor effluent gas can be used to pre-heat the gaseous feed mixture prior to introducing it into the catalytic reactor. The reactor effluent gas can be cooled using a heat exchanger and fed into the transition zone located between the heating and cooling zone or into the cooling zone of a continuous furnace with a separate cooling zone. Finally, the effluent gas can be divided into two or more streams and fed into the heating and cooling zones of a continuous furnace with a separate cooling zone. It can also be introduced into the furnace through multiple injection ports located in the heating and cooling zones.

Low to high carbon or alloy steels that can be heat treated according to the present invention can be selected from the groups 10XX, 11XX, 12XX, 13XX, 15XX, 40XX, 41XX, 43XX, 44XX, 47XX, 48XX, 50XX, 51XX, 61XX, 81XX, 86XX, 87XX, 88XX, 92XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, HX, OX, MX, or SX, iron nickel based alloys such as Incoloy, nickel alloys such as Inconel and Hastalloy, nickel-copper alloys such as Monels, and cobalt based alloys such as Haynes and Stellite can be heat treated according to process disclosed in this invention.

The iron-based powders that can be sintered according to the present invention can be selected from Fe, Fe—C with up to 1% carbon, Fe—Cu—C with up to 20% copper and 1% carbon, Fe—Ni with up to 50% Ni, Fe—Mo—Mn—Cu—Ni—C with up to 1% Mo, Mn, and carbon each and up to 2% Ni and Cu each, Fe—Cr—Mo—Co—Mn—V—W—C with varying concentrations of alloying elements depending on the final properties of the sintered product desired. Other elements such as B, Al, Si, P, S, etc. can optionally be added to the iron-based powders to obtain the desired properties in the final sintered product. These iron-based powders can be mixed with up to 2% zinc stearate to help in pressing parts from them.

Two different external catalytic reactors were used to convert residual oxygen present in the non-cryogenically produced nitrogen with a hydrocarbon gas. A small 1 in. diameter reactor packed with approximately 0.005 ft$^3$ of precious metal catalyst was used initially to study the reaction between residual oxygen and a hydrocarbon gas. After these initial experiments, a 3 in. diameter reactor with 0.0736 ft$^3$ of catalyst was designed and integrated with a heat treating furnace to demonstrate the present invention. The effluent stream from the catalytic reactor was introduced into either the shock zone (transition zone) or the heating zone of the furnace for the heat treating experiments.

Figure 2B:
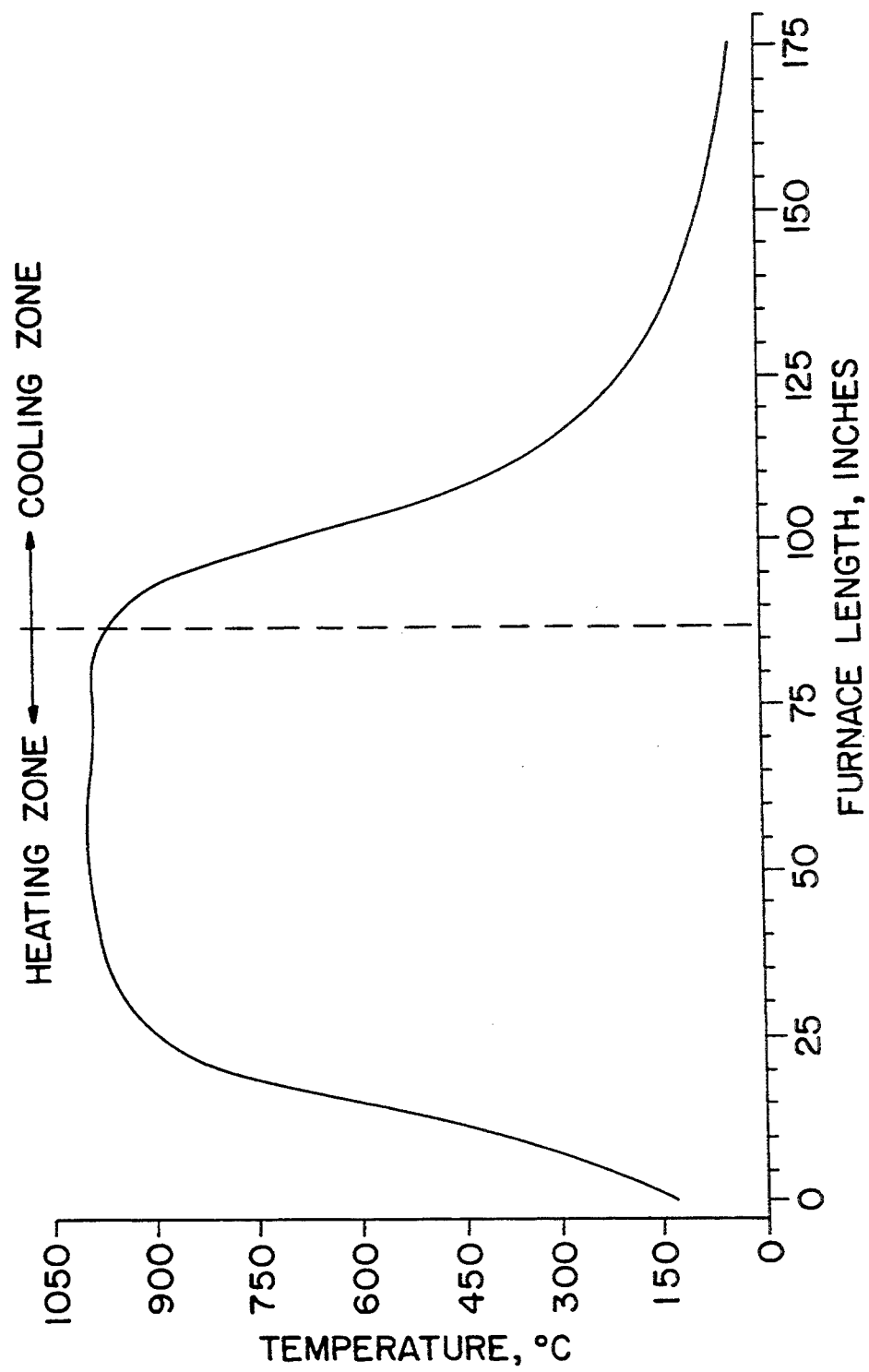
FIG. 2B is a plot similar to that of FIG. 2A for a heat treating temperature of 950° C.

A Watkins-Johnson conveyor belt furnace capable of operating up to a temperature of 1,150° C. was used in all the heat treating experiments. The heating zone of the furnace consisted of 8.75 inches wide, about 4.9 inches high, and 86 inches long Inconel 601 muffle heated resistively from the outside. The cooling zone, made of stainless steel, was 8.75 inches wide, 3.5 inches high, and 90 inches long and was water cooled from the outside. A 8.25 inches wide flexible conveyor belt supported on the floor of the furnace was used to feed the samples to be heat treated through the heating and cooling zones of the furnace. A fixed belt speed of 6 inches per minute was used in all the experiments. The furnace shown schematically as 60 in FIG. 1 was equipped with physical curtains 62 and 64 both on entry 66 and exit 68 sections to prevent air from entering the furnace. The gaseous feed mixture containing nitrogen, moisture, carbon dioxide, unreacted hydrogen, and less than 10 ppm oxygen was introduced into the transition zone (shock zone) located at 70 through an open tube or into the heating zone through an open tube or an introduction device such as shown and described in FIGS. 3A to 3I in U.S. Pat. No. 5,221,369 the specification of which is incorporated herein by reference placed at location 76 in the heating zone of the furnace during heat treating experiments. The shock zone feeding area 70 was located immediately after the heating zone of the furnace, as shown in FIG. 1. The other feeding area 76 was located in the heating zone 40 in. away from the transition zone, as shown in FIG. 1. This feed area was located well into the hottest section of the heating zone as shown by the furnace temperature profile depicted in FIGS. 2A and 2B obtained at 750° C. and 950° C. normal furnace operating temperatures with 350 SCFH of pure nitrogen flowing into furnace 60. The temperature profiles show a rapid cooling of the parts as they move out of the heating zone and enter the cooling zone. Rapid cooling of the parts is commonly used by the heat treating industry to help in preventing oxidation of the parts from high levels of moisture and carbon dioxide in the cooling zone.

The operation of the Watkins-Johnson conveyor belt furnace was modified in order to neutral harden carbon steel samples. The cooling zone of the furnace was disconnected and a quench cooling (oil) bath was attached at the end of the heating zone of the furnace, as shown in FIG. 3. This caused the heat treated samples to drop in the oil bath and cool down rapidly. A fixed belt speed of 3 inches per minute was used in all the neutral hardening experiments. The modified furnace shown schematically as 60' in FIG. 3 was equipped with physical curtains 62' and 64' both on entry 66' and exit 68' sections to prevent air from entering the furnace. The gaseous feed mixture containing nitrogen, moisture, carbon dioxide, unreacted hydrogen, and less than 10 ppm oxygen was introduced into the heating zone through an introduction device as shown in FIGS. 3A to 3I in U.S. Pat. No. 5,221,369 placed at location 76' in the heating zone of the furnace for neutral hardening steel samples 16". The feeding area 76' was located in the heating zone 40 in. away from the end of the furnace, as shown in FIG. 4.

Set forth in Table 1 are the results of deoxygenation tests in 1 in. diameter reactor with natural gas with the catalyst supported on a metallic honeycomb structure

TABLE 1

|  | Example 1A | | | Example 1B | | | Example 1C | |
|---|---|---|---|---|---|---|---|---|
| Flow Rate of Feed Gas, SCFH | 50 | | | 50 | | | 50 | |
| Composition of Feed Gas | | | | | | | | |
| Nitrogen, % | 99.5 | | | 99.5 | | | 99.5 | |
| Oxygen, % | 0.5 | | | 0.5 | | | 0.5 | |
| Catalyst Type | (1) | | | (1) | | | (1) | |
| GHSV, 1/h | 10,000 | | | 10,000 | | | 10,000 | |
| Amount of Natural Gas Added, % | 0.25 | | | 0.50 | | | 1.00 | |
| Feed Gas Temperature, °C. | 255 | 289 | 371 | 260 | 319 | 362 | 263 | 307 |
| Effluent Gas Composition | | | | | | | | |
| Oxygen, ppm | 3,930 | 1,200 | 922 | 3,370 | 32 | <5 | 2,590 | <9 |
| Carbon Dioxide, % | 0.05 | 0.19 | 0.20 | 0.08 | 0.25 | 0.25 | 0.12 | 0.25 |
| Dew Point, °C. | −20 | −5 | −5 | −15 | −2 | −2 | −11 | −2 |

TABLE 1-continued

|  | Example 1A |  |  | Example 1B |  |  | Example 1C |  |
|---|---|---|---|---|---|---|---|---|
| Methane, % | 0.22 | 0.06 | 0.04 | 0.42 | 0.25 | 0.25 | 0.88 | 0.75 |

(1) 0.2% Platinum/Palladium Supported on Metallic Honeycomb

EXAMPLE 1A

A nitrogen stream containing 0.5% (5,000 ppm) oxygen was heated to a desired temperature using a preheater. It was then mixed with 0.25% natural gas (containing predominately methane) and deoxygenated by passing the gaseous feed mixture through a 1 in. diameter catalytic reactor packed with 0.2% platinum metal catalyst supported on a metallic honeycomb structure with a cell density of approximately 200 cells/in.$^2$. The honeycomb catalyst was supplied by Johnson Matthey of Wayne, Pa. The composition of nitrogen used in this example was similar to that commonly produced by non-cryogenic separation techniques. The amount of natural gas used was equal to the stoichiometric amount required to convert oxygen completely to a mixture of moisture and carbon dioxide. The hourly flow rate of nitrogen stream through the reactor was 10,000 times the volume of the catalyst in the reactor (Gas Hourly Space Velocity or GHSV of 10,000 l/h).

The feed gas was pre-heated to a temperature varying from 255° to about 371° C., as shown in Table 1. The effluent stream from the reactor contained more than 900 ppm oxygen when the feed gas was pre-heated to a temperature as high as 371° C. (see Table 1). This example showed that a feed gas temperature substantially greater than 371° C. is required to remove oxygen from nitrogen stream with a stoichiometric amount of natural gas.

EXAMPLE 1B

The catalytic deoxygenation experiment described in Example 1A was repeated using the same reactor, type of catalyst, flow rate of nitrogen stream (or GHSV of 10,000 l/h), and composition of nitrogen stream with the exception of using 0.5% by volume natural gas. The amount of natural gas used was 2 times the stoichiometric amount required to convert oxygen completely to a mixture of moisture and carbon dioxide. The reactor effluent stream contained less than 5 ppm oxygen when the feed stream was pre-heated to about 362° C. temperature, as shown in Table 1. The residual oxygen was converted to a mixture of moisture and carbon dioxide. This example showed that a feed gas temperature close to 362° C. is required to remove oxygen from nitrogen stream with two times the stoichiometric amount of natural gas.

EXAMPLE 1C

The catalytic deoxygenation experiment described in Example 1A was repeated using the same reactor, type of catalyst, flow rate of nitrogen stream (or GHSV of 10,000 l/h), and composition of nitrogen stream with the exception of using 1.0% by volume natural gas. The amount of natural gas used was 4 times the stoichiometric amount required to convert oxygen completely to a mixture of moisture and carbon dioxide. The reactor effluent stream contained less than 9 ppm oxygen when the feed stream was pre-heated to about 307° C. temperature, as shown in Table 1. This example showed that a feed gas temperature close to 310° C. is required to remove oxygen from nitrogen stream with four times the stoichiometric amount of natural gas.

Examples 1A to 1C showed that the platinum group of metals can be used to reduce oxygen level in the feed nitrogen stream to below 10 ppm level provided the feed stream is pre-heated to a temperature close to 310° C. and added with more than a stoichiometric amount of natural gas.

Summarized in Table 2 are results of deoxygenation test in 1 in. diameter reactor with propane with the catalyst supported on a metallic honeycomb structure

TABLE 2

|  | Example 2A | | Example 2B | | Example 2C | |
|---|---|---|---|---|---|---|
| Flow Rate of Feed Gas, SCFH | 50 | | 50 | | 50 | |
| Composition of Feed Gas | | | | | | |
| Nitrogen, % | 99.5 | | 99.5 | | 99.5 | |
| Oxygen, % | 0.5 | | 0.5 | | 0.5 | |
| Catalyst Type | 0.2 Platinum/Palladium Supported on Metallic Honeycomb | | 0.2 Platinum/Palladium Supported on Metallic Honeycomb | | 0.2 Platinum/Palladium Supported on Metallic Honeycomb | |
| GHSV, l/h | 10,000 | | 10,000 | | 10,000 | |
| Amount of Propane Added, % | 0.13 | | 0.24 | | 0.35 | |
| Feed Gas Temperature, °C. | 168 | 187 | 229 | 174 | 219 | 182 | 215 |
| Effluent Gas Oxygen Level, ppm | 4,600 | 2,790 | <4 | 2,090 | <3 | 617 | <4 |

EXAMPLE 2A

The catalytic deoxygenation experiment described in Example 1A was repeated using the same reactor, type of catalyst, composition of nitrogen stream, and flow rate of nitrogen (or GHSV of 10,000 l/h) with the exception of using 0.13% by volume propane. The amount of propane used was about 1.3 times the stoichiometric amount required to convert oxygen completely to a mixture of moisture and carbon dioxide.

The feed gas was pre-heated to a temperature varying from 168° to about 229° C., as shown in Table 2. The effluent gas from the reactor contained more than 2,500 ppm oxygen when feed gas was pre-heated to a temperature close to 187° C. However, when the feed gas was pre-heated to about 229° C. the effluent contained less than 4 ppm oxygen. This example showed that feed nitrogen needs to be pre-heated to about 229° C. to reduce oxygen level below 10 ppm with slightly more than a stoichiometric amount of propane.

EXAMPLES 2B AND 2C

The catalytic deoxygenation experiment described in Example 2A was repeated twice using the same reactor, type of catalyst, flow rate of nitrogen stream (or GHSV of 10,000 l/h), and composition of nitrogen stream with the exception of using 0.24% and 0.35% by volume propane, respectively. The amount of propane used in these examples was 2.4 and 3.5 times the stoichiometric amount required to convert oxygen completely to a mixture of carbon dioxide and moisture. The reactor effluent stream contained less than 3 ppm oxygen when the feed stream was pre-heated to about 219° C. These examples showed that feed nitrogen needs to be pre-heated to about 220° C. to reduce the oxygen level below 10 ppm with more than two times the stoichiometric amount of propane.

Deoxygenation tests using 1 in. diameter reactor with propane and the catalyst supported on alumina pellets were run and the results summarized in Table 3.

TABLE 3

| | Example 3A | | | Example 3B | | | Example 3C |
|---|---|---|---|---|---|---|---|
| Flow Rate of Feed Gas, SCFH | 50 | | | 50 | | | 50 |
| Composition of Feed Gas | | | | | | | |
| Nitrogen, % | 99.5 | | | 99.5 | | | 99.5 |
| Oxygen, % | 0.5 | | | 0.5 | | | 0.5 |
| Catalyst Type | 0.5% Palladium Supported on Alumina Pellets | | | 0.5% Palladium Supported on Alumina Pellets | | | 0.5% Palladium Supported on Alumina Pellets |
| GHSV, 1/h | 10,000 | | | 10,000 | | | 10,000 |
| Amount of Propane Added, % | 0.13 | | | 0.24 | | | 0.35 |
| Feed Gas Temperature, °C. | 228 | 274 | 301 | 277 | 292 | 233 | 278 |
| Effluent Gas Oxygen Level, ppm | 4,680 | 3,560 | <3 | 2,100 | <2 | 4,280 | <4 |

EXAMPLE 3A

The catalytic deoxygenation experiment described in Example 2A was repeated using the same reactor, composition of nitrogen stream, and flow rate of nitrogen (or GHSV of 10,000 l/h) with the exceptions of using 0.13% by volume propane and 0.5% palladium metal catalyst supported on high surface area alumina pellets. The amount of propane used was about 1.3 times the stoichiometric amount required to convert oxygen completely to a mixture of moisture and carbon dioxide.

The feed nitrogen stream was pre-heated to a temperature varying from 228° to about 301° C., as shown in Table 3. The effluent gas from the reactor contained more than 3,500 ppm oxygen when the feed nitrogen was pre-heated to a temperature to 274° C. However, when the feed gas was heated to 301° C. the effluent contained less than 3 ppm oxygen. This example showed that feed nitrogen needs to be pre-heated about to 301° C. to reduce oxygen level below 10 ppm with more than a stoichiometric amount of propane in the presence of a platinum group metal catalyst supported on alumina pellets.

EXAMPLES 3B AND 3C

The catalytic deoxygenation experiment described in Example 3A was repeated twice using the same reactor, type of catalyst, flow rate of nitrogen stream (or GHSV of 10,000 l/h), and composition of nitrogen stream with the exception of using 0.24% and 0.35% by volume propane, respectively. The amount of propane used was 2.4 and 3.5 times the stoichiometric amount required to convert oxygen completely to a mixture of moisture and carbon dioxide. The reactor effluent gas contained less than 4 ppm oxygen when feed nitrogen was pre-heated to about 292° C. temperature. These examples showed that feed nitrogen needs to be pre-heated about to 292° C. temperature to reduce oxygen level below 10 ppm with more than two times the stoichiometric amount of propane in the presence of a platinum group metal catalyst supported on alumina pellets.

Table 4 summarizes tests of deoxygenation in 3 in. diameter reactor with natural gas with the catalyst supported on alumina pellets and on a honeycomb structure.

TABLE 4

| | Example 4 | Example 5 |
|---|---|---|
| Flow Rate of Feed Gas, SCFH | 350 | 350 |
| Composition of Feed Gas | | |
| Nitrogen, % | 99.5 | 99.5 |
| Oxygen, % | 0.5 | 0.5 |
| Catalyst Type | 0.5% Palladium Supported on Alumina Pellets | 0.5% Platinum/Palladium Supported on Metallic Honeycomb |
| GHSV, 1/h | 4,750 | 4,750 |
| Amount of Natural Gas Added, % | 1.5 | 0.5 |
| Feed Gas Temperature, °C. | 330 | 320 |
| Effluent Gas Oxygen Level, ppm | <2 | <7 |

EXAMPLE 4

A stream of nitrogen (350 SCFH flow) containing 0.5% (5,000 ppm) oxygen was pre-heated to about 330° C. The pre-heated stream was mixed with 1.5% natural gas (containing predominately methane) and deoxygenated by passing the mixture through a 3 in. diameter reactor packed with 0.5% palladium metal catalyst supported on high surface area alumina pellets. The catalyst was supplied by Johnson Matthey of Wayne, Pa. The amount of natural gas used was six times the stoichiometric amount required to convert oxygen completely to a mixture of moisture and carbon dioxide. The hourly flow rate of nitrogen stream through the reactor was 4,750 times the volume of the reactor (Gas Hourly Space Velocity or GHSV of 4,750 1/h), as shown in Table 4. The effluent gas from the reactor contained less than 2 ppm oxygen. This example showed that feed nitrogen needs to be pre-heated to about 330° C. to reduce oxygen level below 10 ppm with natural gas in the presence of a platinum group of metal catalyst supported on alumina.

EXAMPLE 5

The catalytic deoxygenation experiment described in Example 4 was repeated using a similar reactor, composition of nitrogen stream, and flow rate of nitrogen stream (or GHSV of 4,750 l/h) with the exceptions of pre-heating the feed nitrogen to a temperature of 320° C., adding 0.5% natural gas, and using 0.5% platinum plus palladium metal catalyst supported on a metallic honeycomb structure with a cell density of 200 cells per square inch, as shown in Table 4. The catalyst was platinum group of metal catalyst supported on a metallic honeycomb structure.

Tables 5 and 6 summarize results of tests utilizing non-cryogenically produced nitrogen treated according to the present invention used in heat treating carbon steel.

TABLE 5

|  | EXAMPLE 6A | EXAMPLE 6B | EXAMPLE 6C | EXAMPLE 6D | EXAMPLE 6E | EXAMPLE 6F |
|---|---|---|---|---|---|---|
| Experiment No. | 12160-69-01 | 12160-70-03 | 12160-74-09 | 12160-74-10 | 12160-75-12 | 12160-75-14 |
| Heat Treating Temperature, °C. | 600 | 700 | 800 | 900 | 1,000 | 1,100 |
| Feed Gas Location | Transition Zone | Transition Zone | Transition Zone | Transition Zone | Transition Zone | Transition Zone |
| Feed Gas Device | Open Tube | Open Tube | Open Tube | Open Tube | Open Tube | Open Tube |
| Feed Gas Composition |  |  |  |  |  |  |
| Residual Oxygen, ppm | <3 | <3 | <3 | <3 | <3 | <3 |
| Moisture, % | 0.50 | 0.50 | 0.50 | 0.50 | 0.50 | 0.50 |
| Carbon Dioxide, % | 0.25 | 0.25 | 0.25 | 0.25 | 0.25 | 0.25 |
| Methane, % | 0.25 | 0.25 | 0.25 | 0.25 | 0.25 | 0.25 |
| Heating Zone Atmosphere Composition |  |  |  |  |  |  |
| Carbon Monoxide, % | 0.00 | 0.00 | 0.05 | 0.18 | 0.36 | 0.40 |
| Carbon Dioxide, % | 0.25 | 0.25 | 0.25 | 0.20 | 0.12 | 0.10 |
| Hydrogen, % | 0.00 | 0.00 | 0.15 | 0.40 | 0.55 | 0.60 |
| Methane, % | 0.25 | 0.25 | — | — | — | — |
| Dew Point, °C. | −3.0 | −3.0 | −3.5 | −4.0 | −5.0 | −5.0 |
| Cooling Zone Atmosphere Composition |  |  |  |  |  |  |
| Carbon Monoxide, % | 0.00 | 0.00 | 0.00 | 0.00 | 0.05 | 0.05 |
| Carbon Dioxide, % | 0.25 | 0.25 | 0.25 | 0.25 | 0.25 | 0.25 |
| Hydrogen, % | 0.00 | 0.00 | 0.00 | 0.00 | 0.10 | 0.10 |
| Methane, % | 0.25 | 0.25 | — | — | — | — |
| Dew Point, °C. | −3.0 | −3.0 | −3.0 | −3.0 | −3.0 | −3.0 |
| Quality of Heat Treated Samples | Uniform Yellowish Oxide | Uniform Yellowish Oxide | Uniform Light Blue Oxide | Uniform Light Blue Oxide | Uniform Light Blue Oxide | Uniform Light Blue Oxide |

TABLE 6

|  | EXAMPLE 7A | EXAMPLE 7B | EXAMPLE 7C | EXAMPLE 7D | EXAMPLE 7E |
|---|---|---|---|---|---|
| Experiment No. | 12160-11-25 | 12160-11-26 | 12160-11-27 | 12160-12-28 | 12160-12-29 |
| Heat Treating Temperature, °C. | 600 | 700 | 800 | 900 | 1,000 |
| Feed Gas Location | Transition Zone | Transition Zone | Transition Zone | Transition Zone | Transition Zone |
| Feed Gas Device | Open Tube | Open Tube | Open Tube | Open Tube | Open Tube |
| Feed Gas Composition |  |  |  |  |  |
| Residual Oxygen, ppm | <2 | <2 | <2 | <2 | <2 |
| Moisture, % | 0.50 | 0.50 | 0.50 | 0.50 | 0.50 |
| Carbon Dioxide, % | 0.25 | 0.25 | 0.25 | 0.25 | 0.25 |
| Methane, % | 1.75 | 1.75 | 1.75 | 1.75 | 1.75 |
| Heating Zone Atmosphere Composition |  |  |  |  |  |
| Carbon Monoxide, % | 0.00 | 0.20 | 0.45 | 0.70 | 0.70 |
| Carbon Dioxide, % | 0.25 | 0.15 | 0.08 | 0.03 | 0.01 |
| Hydrogen, % | 0.00 | 0.20 | 0.70 | 1.80 | 2.6 |
| Methane, % | 1.75 | 1.65 | — | — | — |
| Dew Point, °C. | −3.0 | −10.1 | −20.1 | −44.0 | −50.0 |
| Cooling Zone Atmosphere Composition |  |  |  |  |  |
| Carbon Monoxide, % | 0.00 | 0.00 | 0.00 | 0.00 | 0.05 |
| Carbon Dioxide, % | 0.25 | 0.25 | 0.25 | 0.25 | 0.25 |
| Hydrogen, % | 0.00 | 0.00 | 0.00 | 0.00 | 0.10 |
| Methane, % | 1.75 | 1.75 | — | — | — |
| Dew Point, °C. | −3.0 | −3.0 | −3.0 | −3.0 | −3.0 |
| Quality of Heat Treated Samples | Uniform Yellowish Oxide | Uniform Yellowish Oxide | Uniform Bright | Uniform Bright | Uniform Bright |
| Decarburization Depth, in. | — | — | 0.005 | 0.006 | 0.006 | supplied by Johnson Matthey of Wayne, Pa. The amount of natural gas used was two times the stoichiometric amount required to convert oxygen completely to a mixture of moisture and carbon dioxide. The reactor effluent gas contained less than 7 ppm oxygen (see Table 4). This example showed that feed nitrogen needs to pre-heated to about 320° C. to reduce oxygen level below 10 ppm with natural gas in the presence of a

EXAMPLE 6

The catalytic deoxygenation experiment described in Example 5 was repeated using a similar reactor, type of catalyst, composition of nitrogen stream, flow rate of nitrogen stream (or GHSV of 4,750 l/h), and the amount of natural gas (0.5%) with the exception of pre-heating the feed nitrogen to 290° C. The amount of natural gas used was two times the stoichiometric amount required to convert oxygen completely to a mixture of moisture and carbon dioxide. The reactor effluent gas contained less than 5 ppm oxygen. Additionally, it contained 0.25% unreacted natural gas, 0.25% carbon dioxide, and 0. 50% moisture.

The reactor effluent stream was introduced into the transition zone (located between the heating and cooling zones) of the Watkins-Johnson furnace to heat treat carbon steel samples as described below.

EXAMPLES 6A AND 6B

The reactor effluent gas stream from Example 6 was introduced into the transition zone of the Watkins-Johnson furnace set up to anneal carbon steel samples at 600° and 700° C. in Examples 6A and 6B, respectively. The as annealed had a uniform yellowish oxide surface finish, as shown in Table 5. The uniform oxide surface finish was due to the presence of oxidizing atmosphere both in the heating and cooling zones of the furnace. These examples showed that carbon steel samples can be oxide annealed at or below 700° C. using non-cryogenically produced nitrogen that has been deoxygenated with about two times the stoichiometric amount of a hydrocarbon gas in an external catalytic reactor and introduced into the cooling or the transition zone of the furnace.

EXAMPLES 6C TO 6F

Example 6A was repeated four times using the present invention and the furnace to anneal carbon steel samples at 800°, 900°, 1,000°, and 1,100° C. (Examples 6C to 6F respectively). The as-annealed samples had a uniform light blue oxide surface finish, as shown in Table 5. These examples showed that carbon steel samples can be oxide annealed in non-cryogenically produced nitrogen that has been deoxygenated with about two times the stoichiometric amount of a hydrocarbon gas in an external catalytic reactor and introduced into the cooling or the transition zone of the furnace.

EXAMPLE 7I

The catalytic deoxygenation experiment described in Example 4 was repeated using 2.0% natural gas. The amount of natural gas used was eight times the stoichiometric amount required to convert oxygen completely to a mixture of moisture and carbon dioxide. The reactor effluent gas contained less than 5 ppm oxygen. Additionally, it contained 1.75 unreacted natural gas, 0.25% carbon dioxide, and 0.50% moisture.

The reactor effluent stream was introduced into the transition zone (located between the heating and cooling zones) of the Watkins-Johnson furnace to heat treat carbon steel samples as in described below.

EXAMPLES 7A AND 7B

The reactor effluent gas stream from Example 7 was introduced into the transition zone of the Watkins-Johnson furnace to anneal carbon steel samples at 600° and 700° C. (Examples 7A and 7B, respectively). The as-annealed samples had a uniform yellowish oxide surface finish, as shown in Table 6. The oxidation of the samples was due to the presence of oxidizing atmosphere both in the heating and cooling zones of the furnace (see Table 6). These examples showed that carbon steel samples can be oxide annealed at or below 700° C. using non-cryogenically produced nitrogen that has been deoxygenated with about eight times the stoichiometric amount of a hydrocarbon gas in an external catalytic reactor and introduced into the cooling or the transition zone of the furnace.

EXAMPLES 7C TO 7E

Example 7A was repeated three times using the present invention and the furnace to anneal carbon steel samples at 800°, 900°, and 1,000° C. (Examples 6C to 6E, respectively). The as-annealed samples had a uniform bright surface finish, as shown in Table 6. The samples were bright annealed due to 1) the presence of reducing atmosphere in the heating zone and 2) the rapid cooling of the samples in the cooling zone. The cross-sectional analysis of the samples showed the presence of 0.005 to 0.006 inch thick surface decarburized layer (see Table 6). These examples showed that carbon steel samples can be bright, decarburized annealed in non-cryogenically produced nitrogen that has been deoxygenated with more than two times the stoichiometric amount of a hydrocarbon gas in an external catalytic reactor and introduced into the cooling or the transition zone of the furnace.

Examples 6A to 6F and 7A to 7E show that carbon steel samples can be oxide annealed in non-cryogenically produced nitrogen that has been deoxygenated with more than a stoichiometric amount of a hydrocarbon gas in an external catalytic reactor and introduced into the cooling or the transition zone of the furnace. These examples also show that carbon steel samples can be bright, decarburized annealed above about 700° C. temperature in non-cryogenically produced nitrogen that has been deoxygenated with more than two times the stoichiometric amount of a hydrocarbon gas in an external catalytic reactor and introduced into the cooling or the transition zone of the furnace.

EXAMPLE 8

The catalytic deoxygenation experiment described in Example 5 was repeated using a similar reactor, type of catalyst, composition of nitrogen stream, flow rate of nitrogen stream (or GHSV of 4,750 l/h), and the amount of natural gas (0.5%) with the exception of pre-heating the feed nitrogen to 290° C. temperature. The amount of natural gas used was two times the stoichiometric amount required to convert oxygen completely to a mixture of moisture and carbon dioxide. The reactor effluent gas contained less than 5 ppm oxygen. Additionally, it contained 0.25% unreacted natural gas, 0.25% carbon dioxide, and 0.50% moisture.

The reactor effluent stream was introduced into the heating zone of the Watkins-Johnson furnace to heat treat carbon steel samples in accord with the data presented in Table 7 and the following discussion.

TABLE 7

|  | EXAMPLE 8A | EXAMPLE 8B | EXAMPLE 8C | EXAMPLE 8D | EXAMPLE 8E | EXAMPLE 8F |
|---|---|---|---|---|---|---|
| Experiment No. | 12160-76-15 | 12160-77-17 | 12160-77-19 | 12160-79-22 | 12160-79-24 | 12160-80-26 |
| Heat Treating Temperature, °C. | 600 | 700 | 800 | 900 | 1,000 | 1,100 |
| Feed Gas Location | Heating Zone | Heating Zone | Heating Zone | Heating Zone | Heating Zone | Heating Zone |
| Feed Gas Device | Modified Diffuser | Modified Diffuser | Modified Diffuser | Modified Diffuser | Modified Diffuser | Modified Diffuser |

TABLE 7-continued

|  | EXAMPLE 8A | EXAMPLE 8B | EXAMPLE 8C | EXAMPLE 8D | EXAMPLE 8E | EXAMPLE 8F |
| --- | --- | --- | --- | --- | --- | --- |
| Feed Gas Composition |  |  |  |  |  |  |
| Residual Oxygen, ppm | <3 | <3 | <3 | <3 | <3 | <3 |
| Moisture, % | 0.50 | 0.50 | 0.50 | 0.50 | 0.50 | 0.50 |
| Carbon Dioxide, % | 0.25 | 0.25 | 0.25 | 0.25 | 0.25 | 0.25 |
| Methane, % | 0.25 | 0.25 | 0.25 | 0.25 | 0.25 | 0.25 |
| Heating Zone Atmosphere Composition |  |  |  |  |  |  |
| Carbon Monoxide, % | 0.00 | 0.05 | 0.05 | 0.15 | 0.35 | 0.40 |
| Carbon Dioxide, % | 0.25 | 0.23 | 0.22 | 0.20 | 0.15 | 0.09 |
| Hydrogen, % | 0.00 | 0.10 | 0.10 | 0.35 | 0.6 | 0.7 |
| Methane, % | 0.25 | 0.23 | 0.22 | — | — | — |
| Dew Point, °C. | −3.0 | −3.0 | — | −10.2 | −12.1 | −12.1 |
| Cooling Zone Atmosphere Composition |  |  |  |  |  |  |
| Carbon Monoxide, % | 0.00 | 0.05 | 0.05 | 0.15 | 0.35 | 0.40 |
| Carbon Dioxide, % | 0.25 | 0.23 | 0.22 | 0.20 | 0.15 | 0.09 |
| Hydrogen, % | 0.00 | 0.10 | 0.10 | 0.35 | 0.6 | 0.7 |
| Methane, % | 0.25 | 0.23 | 0.22 | — | — | — |
| Dew Point, °C. | −3.0 | −3.0 | — | −10.7 | −12.0 | −12.7 |
| Quality of Heat Treated Samples | Uniform Yellowish Oxide | Uniform Yellowish Oxide | Uniform Bright | Uniform Bright | Uniform Bright | Uniform Bright |
| Decarburization Depth, in. | — | — | 0.005 | 0.005 | 0.006 | 0.006 |

EXAMPLES 8A AND 8B

The reactor effluent stream from Example 8 was used to anneal carbon steel samples at 600° and 700° C. in the furnace. It was introduced into the heating zone of the furnace (location 76 in FIG. 1) through a porous diffuser shown as 40 in FIG. 3C of U.S. patent application Ser. No. 07/727,806, the diffuser had a top half of ¾ in. diameter, 6 in. long porous Inconel material with a total of 96, 1/16 in. diameter holes. The size and number of holes in the diffuser were selected so that there was uniform flow of gas through each hole. The bottom half of diffuser was gas impervious Inconel with one end of diffuser 40 capped and the other end attached to a ½ in. diameter stainless steel feed tube inserted into the furnace 60 through the cooling end vestibule 68. The bottom half of diffuser was positioned parallel to the parts 16' being treated thus essentially directing the flow of feed gas towards the hot ceiling of the furnace prevent direct impingement of feed gas on the parts.

The as-annealed samples had a uniform yellowish oxide surface finish, as shown in Table 7. These examples showed that carbon steel samples can be oxide annealed at or below 700° C. in non-cryogenically produced nitrogen that has been deoxygenated with about two times the stoichiometric amount of a hydrocarbon gas in an external catalytic reactor and introduced into the heating zone of the furnace.

EXAMPLES 8C TO 8F

Example 8A was repeated four times to anneal carbon steel samples at 800°, 900°, 1,000°, and 1,100° C. (Examples 8C to 8F). The samples were annealed with a uniform, bright surface finish, as shown in Table 7. They were bright annealed due to the presence of reducing gases such as carbon monoxide and hydrogen in the heating and cooling zones of the furnace. These reducing gases were produced by shift conversion of a part of both carbon dioxide and moisture with the hydrocarbon gas. The cross-sectional analysis of the samples showed the presence of a 0.005 to 0.006 inch thick surface decarburized layer (see Table 7). These examples showed that carbon steel samples can be bright, decarburized annealed at a temperature above about 700° C. in non-cryogenically produced nitrogen that has been deoxygenated with two times the stoichiometric amount of a hydrocarbon gas in an external catalytic reactor and introduced into the heating zone of the furnace.

EXAMPLE 9

The catalytic deoxygenation experiment described in Example 5 was repeated using a similar reactor, type of catalyst, composition of nitrogen stream, and flow rate of nitrogen stream (or GHSV of 4,750 l/h) with the exceptions of using 1.0% natural gas and pre-heating the feed nitrogen to 290° C. temperature. The amount of natural gas used was four times the stoichiometric amount required to convert oxygen completely to a mixture of moisture and carbon dioxide. The reactor effluent gas contained less than 5 ppm oxygen. Additionally, it contained 0.75% unreacted natural gas, 0.254 carbon dioxide, and 0.50% moisture.

The reactor effluent stream was introduced into the heating zone of the Watkins-Johnson furnace to heat treat carbon steel samples in accord with the data presented in Table 8 and summarized below.

TABLE 8

|  | EXAMPLE 9A | EXAMPLE 9B | EXAMPLE 9C | EXAMPLE 9D | EXAMPLE 9E | EXAMPLE 9F |
| --- | --- | --- | --- | --- | --- | --- |
| Experiment No. | 12160-86-01 | 12160-87-03 | 12160-87-05 | 12160-88-07 | 12160-89-09 | 12160-90-11 |
| Heat Treating Temperature, °C. | 600 | 700 | 800 | 900 | 1,000 | 1,100 |
| Feed Gas Location | Heating Zone | Heating Zone | Heating Zone | Heating Zone | Heating Zone | Heating Zone |
| Feed Gas Device | Modified Diffuser | Modified Diffuser | Modified Diffuser | Modified Diffuser | Modified Diffuser | Modified Diffuser |
| Feed Gas Composition |  |  |  |  |  |  |
| Residual Oxygen, ppm | <3 | <3 | <3 | <3 | <3 | <3 |
| Moisture, % | 0.50 | 0.50 | 0.50 | 0.50 | 0.50 | 0.50 |

TABLE 8-continued

| | EXAMPLE 9A | EXAMPLE 9B | EXAMPLE 9C | EXAMPLE 9D | EXAMPLE 9E | EXAMPLE 9F |
|---|---|---|---|---|---|---|
| Carbon Dioxide, % | 0.25 | 0.25 | 0.25 | 0.25 | 0.25 | 0.25 |
| Methane, % | 0.75 | 0.75 | 0.75 | 0.75 | 0.75 | 0.75 |
| Heating Zone Atmosphere Composition | | | | | | |
| Carbon Monoxide, % | 0.00 | 0.05 | 0.15 | 0.45 | 0.70 | 0.85 |
| Carbon Dioxide, % | 0.25 | 0.23 | 0.20 | 0.12 | 0.05 | 0.03 |
| Hydrogen, % | 0.00 | 0.10 | 0.25 | 0.90 | 1.1 | 1.3 |
| Methane, % | 0.75 | 0.72 | — | — | — | — |
| Dew Point, °C. | −3.0 | −15.2 | −17.4 | −46.2 | −50.1 | −56.1 |
| Cooling Zone Atmosphere Composition | | | | | | |
| Carbon Monoxide, % | 0.00 | 0.10 | 0.25 | 0.50 | 0.70 | 0.80 |
| Carbon Dioxide, % | 0.25 | 0.23 | 0.20 | 0.12 | 0.05 | 0.03 |
| Hydrogen, % | 0.00 | 0.20 | 0.35 | 0.9 | 1.2 | 1.40 |
| Methane, % | 0.75 | 0.72 | — | — | — | — |
| Dew Point, °C. | −3.0 | −21.4 | −23.6 | −46.2 | −50.1 | −56.1 |
| Quality of Heat Treated Samples | Uniform Yellowish Oxide | Uniform Yellowish Oxide | Uniform Bright | Uniform Bright | Uniform Bright | Uniform Bright |
| Decarburization Depth, in. | — | — | 0.005 | 0.0045 | 0.003 | 0.002 |

EXAMPLES 9A AND 9B

The reactor effluent stream from Example 9 was introduced into the heating zone of the furnace using a device similar to the one described in Example 8A and used to anneal carbon steel samples at 600° and 700° C. The as-annealed samples had a uniform yellowish oxide surface finish, as shown in Table 8. These examples showed that carbon steel samples can be oxide annealed at or below 700° C. in non-cryogenically produced nitrogen that has been deoxygenated with about four times the stoichiometric amount of a hydrocarbon gas in an external catalytic reactor and introduced into the heating zone of the furnace.

EXAMPLES 9C TO 9F

Example 9A was repeated four times to anneal carbon steel samples at 800°, 900°, 1,000°, and 1,100° C. (Examples 9C to 9F, as shown in Table 8). The as-annealed samples had a uniform, bright surface finish, as shown in Table 8. They were bright annealed due to the presence of reducing gases such as carbon monoxide and hydrogen in the heating and cooling zones of the furnace. These reducing gases were produced by shift conversion of a part of both carbon dioxide and moisture with the hydrocarbon gas. The cross-sectional analysis of the samples showed the presence of a 0.002 to 0.005 inch thick surface decarburized layer (see Table 8). The thickness of the decarburized layer decreased with an increase in the annealing temperature. These examples showed that carbon steel samples can be bright annealed with a controlled thickness of the decarburized layer in non-cryogenically produced nitrogen that has been deoxygenated with more than two times the stoichiometric amount of a hydrocarbon gas in an external catalytic reactor and introduced into the heating zone of the furnace.

EXAMPLE 10

The catalytic deoxygenation experiment described in Example 5 was repeated using 2.5% natural gas. The amount of natural gas used was ten times the stoichiometric amount required to convert oxygen completely to a mixture of moisture and carbon dioxide. The reactor effluent gas contained less than 5 ppm oxygen. Additionally, it contained 2.25% unreacted natural gas, 0.25% carbon dioxide, and 0.50% moisture.

The reactor effluent stream was introduced into the heating zone of the Watkins-Johnson furnace to heat treat carbon steel and sinter steel samples in accord with the data presented in Table 9 and summarized below.

TABLE 9

| | EXAMPLE 10A | EXAMPLE 10B | EXAMPLE 10C | EXAMPLE 10D | EXAMPLE 10E |
|---|---|---|---|---|---|
| Experiment No. | 12160-07-16 | 12160-07-18 | 12160-08-20 | 12160-09-24 | 12160-25-09 |
| Heat Treating Temperature, °C. | 850 | 900 | 950 | 1,050 | 1,120 |
| Feed Gas Location | Heating Zone | Heating Zone | Heating Zone | Heating Zone | Heating Zone |
| Feed Gas Device | Modified Diffuser | Modified Diffuser | Modified Diffuser | Modified Diffuser | Modified Diffuser |
| Feed Gas Composition | | | | | |
| Residual Oxygen, ppm | <3 | <1 | <3 | <3 | <3 |
| Moisture, % | 0.50 | 0.50 | 0.50 | 0.50 | 0.50 |
| Carbon Dioxide, % | 0.25 | 0.25 | 0.25 | 0.25 | 0.25 |
| Methane, % | 2.25 | 2.25 | 2.25 | 2.25 | 2.25 |
| Heating Zone Atmosphere Composition | | | | | |
| Carbon Monoxide, % | 0.55 | 0.70 | 0.85 | 0.90 | 0.95 |
| Carbon Dioxide, % | 0.05 | 0.04 | 0.03 | 0.02 | 0.01 |
| Hydrogen, % | 1.2 | — | — | — | — |
| Methane, % | — | — | — | — | — |
| Dew Point, °C. | −28.2 | −35.1 | −48.1 | −57.1 | −57.5 |
| Cooling Zone Atmosphere Composition | | | | | |
| Carbon Monoxide, % | 0.55 | 0.70 | 0.85 | 0.90 | 0.95 |
| Carbon Dioxide, % | 0.05 | 0.04 | 0.03 | 0.02 | 0.02 |
| Hydrogen, % | 1.3 | — | — | — | — |
| Methane, % | — | — | — | — | — |

TABLE 9-continued

|  | EXAMPLE 10A | EXAMPLE 10B | EXAMPLE 10C | EXAMPLE 10D | EXAMPLE 10E |
| --- | --- | --- | --- | --- | --- |
| Dew Point, °C. | −28.5 | −35.3 | −50.1 | −56.7 | −57.4 |
| Quality of Heat Treated Samples | Uniform Bright | Uniform Bright | Uniform Bright | Uniform Bright | Good Quality Sintered Parts |
| Decarburization Depth, in. | 0.005 | 0.0035 | 0.002 | 0.002 | — |

EXAMPLES 10A TO 10D

The reactor effluent stream from Example 10 was introduced into the heating zone of the furnace using a device similar to the one described in Example 8A and used to anneal carbon steel samples at 850°, 900°, 950°, and 1,050° C. (Examples 10A to 10D, respectively). The as-annealed samples had a uniform, bright surface finish, as shown in Table 9. They were bright annealed due to the presence of reducing gases such as carbon monoxide and hydrogen in the heating and cooling zones of the furnace. The cross-sectional analysis of the samples showed the presence of a 0.002 to 0.005 inch thick surface decarburized layer (see Table 9B). The thickness of the decarburized layer decreased with an increase in the annealing temperature. These examples showed that carbon steel samples can be bright annealed with a controlled thickness of the decarburized layer in non-cryogenically produced nitrogen that has been deoxygenated with more than two times the stoichiometric amount of a hydrocarbon gas in an external catalytic reactor and introduced into the heating zone of the furnace.

EXAMPLES 10E

The reactor effluent stream from Example 10 was introduced into the heating zone of the furnace using a device similar to the one described in Example 8A and used to sinter a number of steel parts at 1120° C. The parts were made of steel powder containing 2.0% copper, 0.75% zinc stearate, 0.9% carbon and balance iron. They were delubed to remove zinc stearate and other lubricants prior to sintering in the furnace. The powder metal parts sintered in this example were bright due to reducing nature of the atmosphere both in the heating and cooling zones of the furnace, as shown in Table 9. Cross-sectional analysis of a sintered part showed it to be dense with bulk density of approximately 6.8 g/cm$^3$ which was very similar to the value noted with in a similar part sintered in pure nitrogen-hydrogen mixture. The bulk of the sintered part contained a carbon level between 0.6 to 0.7%, which was once again similar to the level noted in a similar part sintered in pure hydrogen-nitrogen mixture. The physical dimensions of the sintered part were also very similar to those noted with a similar part sintered in pure nitrogen-hydrogen mixture.

This example showed steel powder metal parts can be sintered at 1,120° C. in non-cryogenically produced nitrogen that has been deoxygenated with more than two times the stoichiometric amount of a hydrocarbon gas in an external catalytic reactor and introduced into the heating zone of the furnace.

Examples 8A to 8F, 9A to 9F, and 10A to 10E revealed that carbon steel samples can be oxide annealed at or below 700° C. temperature in non-cryogenically produced nitrogen that has been deoxygenated with more than stoichiometric amount of a hydrocarbon gas in an external catalytic reactor and introduced into the heating zone of the furnace. They also show that carbon steel samples can be bright annealed above about 700° C. temperature with a controlled thickness of the decarburized layer in non-cryogenically produced nitrogen that has been deoxygenated with more than two times the stoichiometric amount of a hydrocarbon gas in an external catalytic reactor and introduced into the heating zone of the furnace. Finally, Example 10E showed that a non-cryogenically produced nitrogen that has been deoxygenated with more than two times the stoichiometric amount of a hydrocarbon gas in an external catalytic reactor and introduced into the heating zone of the furnace can be used to sinter steel parts.

Set forth in Table 10 are the results of tests where atmospheres produced according to the invention were used to neutral harden carbon steel.

TABLE 10

|  | EXAMPLE 11A | EXAMPLE 11B | EXAMPLE 11C | EXAMPLE 11C |
| --- | --- | --- | --- | --- |
| Experiment No. | 12624-102-2 | 12624-103-4 | 12624-104-6 | 12624-104-8 |
| Heat Treating Temperature °C. | 850 | 850 | 850 | 850 |
| Feed Gas Location | Heating Zone | Heating Zone | Heating Zone | Heating Zone |
| Feed Gas Device | Modified Diffuser | Modified Diffuser | Modified Diffuser | Modified Diffuser |
| Feed Gas Composition |  |  |  |  |
| Residual Oxygen, ppm | <3 | <3 | <3 | <3 |
| Moisture, % | 0.50 | 0.50 | 0.50 | 0.50 |
| Carbon Dioxide, % | 0.25 | 0.25 | 0.25 | 0.25 |
| Methane, % | 1.25 | 1.75 | 2.25 | 2.25 |
| Heating Zone Atmosphere Composition |  |  |  |  |
| Carbon Monoxide, % | 0.75 | 0.80 | 0.90 | 0.90 |
| Carbon Dioxide, % | 0.05 | 0.04 | 0.02 | 0.03 |
| Dew Point, °C. | −46 | −50 | −57 | −57 |
| Decarburization Depth, in. |  |  |  |  |
| 1050 Steel | 0.003 | 0.001 | None | None |
| 1075 Steel | 0.003 | 0.001 | None | None |

EXAMPLE 11A

The catalytic deoxygenation experiment described in Example 5 was repeated using a similar reactor, type of catalyst, composition of nitrogen stream, flow rate of nitrogen stream (or GHSV of 4,750 1/h), and the amount of natural gas (1.54) with the exception of preheating the feed nitrogen to a temperature of 290° C. The amount of natural gas used was six times the stoichiometric amount required to convert oxygen completely to a mixture of moisture and carbon dioxide. The reactor effluent gas contained less than 3 ppm oxygen. Additionally, it contained 1.25% unreacted natural gas, 0.25% carbon dioxide, and 0.50% moisture.

The reactor effluent stream was introduced into the heating zone of the Watkins-Johnson furnace modified for neutral hardening and operated at 850° C. and equipped with an integrated quench cooling zone to heat treat 1050 and 1075 carbon steel samples. The reactor effluent gas was introduced into the heating zone using a device similar to the one described in Example 8A. The samples were heat treated in this example without any scale on the surface. The cross-sectional analysis of the samples showed the presence of 0.003 inch thick surface decarburized layer (see Table 10). This example therefore showed that carbon steel samples can be hardened with minor surface decarburization in non-cryogenically produced nitrogen that has been deoxygenated with more than six times the stoichiometric amount of natural gas in an external catalytic reactor and introduced into the heating zone of the furnace.

EXAMPLE 11B

The catalytic deoxygenation followed by heat treating experiment described in Example 11A was repeated using a similar reactor, type of catalyst, composition of nitrogen stream, flow rate of nitrogen stream (or GHSV or 4,750 l/h), and the furnace with the exception of using 2.04 natural gas. The amount of natural gas used was eight times the stoichiometric amount required to convert oxygen completely to a mixture of moisture and carbon dioxide. The reactor effluent gas contained less than 3 ppm oxygen. Additionally, it contained 1.75% unreacted natural gas, 0.25% carbon dioxide, and 0.50% moisture.

The samples were heat treated in this example without any scale on the surface. Cross-sectional analysis of the samples showed the presence of 0.001 inch thick surface decarburized layer. This example therefore showed that carbon steel samples can be hardened with minor surface decarburization in non-cryogenically produced nitrogen that has been deoxygenated with more than eight times the stoichiometric amount of natural gas in an external catalytic reactor and introduced into the heating zone of the furnace.

EXAMPLE 11C

The catalytic deoxygenation followed by heat treating experiment described in Example 11A was repeated using a similar reactor, type of catalyst, composition of nitrogen stream, flow rate of nitrogen stream (or GHSV of 4,750 l/h), and the furnace with the exception of using 2.5% natural gas. The amount of natural gas used was ten times the stoichiometric amount required to convert oxygen completely to a mixture of moisture and carbon dioxide. The reactor effluent gas contained less than 3 ppm oxygen. Additionally, it contained 2.25% unreacted natural gas, 0.25% carbon dioxide, and 0.50% moisture.

The samples were heat treated in this example without any scale on the surface. The cross-sectional analysis of the samples showed absence of any surface decarburized layer (see Table 10). This example therefore showed that carbon steel samples can be neutral hardened in non-cryogenically produced nitrogen that has been deoxygenated with more than ten times the stoichiometric amount of natural gas in an external catalytic reactor and introduced into the heating zone of the furnace. This is an unexpected and significant finding.

EXAMPLE 11D

The catalytic deoxygenation followed by heat treating experiment described in Example 11A was repeated using a similar reactor, type of catalyst, composition of nitrogen stream, flow rate of nitrogen stream (or GHSV of 4,750 l/h), and the furnace with the exception of using 3.0% natural gas. The amount of natural gas used was twelve times the stoichiometric amount required to convert oxygen completely to a mixture of moisture and carbon dioxide. The reactor effluent gas contained less than 3 ppm oxygen. Additionally, it contained 2.75% unreacted natural gas, 0.25% carbon dioxide, and 0.50% moisture.

The samples were heat treated in this example without any scale on the surface. The cross-sectional analysis of the samples showed absence of any surface decarburized layer (see Table 10). This example therefore showed that carbon steel samples can be neutral hardened in non-cryogenically produced nitrogen that has been deoxygenated with more than ten times the stoichiometric amount of natural gas in an external catalytic reactor and introduced into the heating zone of the furnace. This is an unexpected and significant finding.

Examples 11A to 11D show that medium and high carbon steel samples can be neutral hardened at above about 800° C. temperature in a continuous furnace equipped with an integrated quench cooling zone using non-cryogenically generated nitrogen that has been deoxygenated with ten or more times stoichiometric amount of natural gas in an external catalytic reactor and introduced into the heating zone of the furnace through a diffuser.

Having thus described our invention what is desired to be protected by Letters Patent of the United States is set forth in the appended claims.

What we claim:

1. A method for generating a controlled atmosphere inside a continuous heat treating furnace for maintaining or affecting the surface characteristics of parts exposed to said atmosphere comprising the steps of:

mixing non-cryogenically produced nitrogen containing up to five percent by volume residual oxygen with more than a stoichiometric amount of a non-oxygen containing hydrocarbon gas required to react with said oxygen;

pre-heating said mixture to a temperature at or above 200° C.;

passing said mixture through catalytic reactor containing a bed of a precious metal catalyst under conditions wherein temperature of the mixture is maintained at or above 200° C. to form an effluent gas containing nitrogen, unreacted hydrocarbon gas, moisture carbon dioxide and less than 10 ppm oxygen;

introducing said effluent gas into said continuous heat treating furnaces heating zone in order to permit conversion of moisture and carbon dioxide in said effluent in-situ in the furnace to a mixture of carbon monoxide and hydrogen by reaction with said hydrocarbon gas via water gas shift reaction.

2. A method according to claim 1 wherein said hydrocarbon gas is selected from the group consisting of alkanes, alkenes and mixtures thereof.

3. A method according to claim 1 wherein said hydrocarbon gas is selected from the group consisting of methane, ethane, propane, butane, ethylene, propylene, butene and mixtures thereof.

4. A method according to claim 1 wherein non-cryogenically produced nitrogen is mixed with at least 1.05 times the stoichiometric amount of hydrocarbon gas required to convert residual oxygen to moisture and carbon dioxide.

5. A method according to claim 1 wherein said mixture of non-cryogenically produced nitrogen and hydrocarbon gas is passed through a catalytic reactor having a precious metal catalyst supported on alumina or a metallic or ceramic honeycomb, said mixture passing at an hourly flow rate of between 4,000 to 50,000 times the volume of the reactor.

6. A method according to claim 1 wherein the flow rate of hydrocarbon gas mixed with said non-cryogenical produced nitrogen is adjusted so that the $pH_2/pH_2O$ and $pCO/pCO_2$ ratios inside the furnace indicates the furnace atmosphere is reducing in nature.

7. A method according to claim 1 wherein said effluent is introduced into said furnace by directing said effluent away from direct impingement on said parts.

8. A method according to claim 1 wherein the temperature of the furnace and the amount of hydrocarbon gas are controlled to control surface decarburization of ferrous metal parts passing through said furnace.

9. A method according to claim 1 wherein said furnace is heated to a temperature above 600° C.

10. A method according to claim 1 wherein the said effluent is used for bright annealing ferrous and non-ferrous parts, brazing parts, neutral hardening, sintering metal and ceramic powders, and sealing glass to metals.

* * * * *